US007173532B2

(12) United States Patent
Hanle et al.

(10) Patent No.: US 7,173,532 B2
(45) Date of Patent: Feb. 6, 2007

(54) INTELLIGENT CONTROLLED ENTRY-EXIT SYSTEM

(75) Inventors: John Paul Hanle, Silver Spring, MD (US); Alexander McAllister, Cape Coral, FL (US); James Kunkel, Lothian, MD (US); Rita Yadav, Fulton, MD (US)

(73) Assignee: Xegesis, LLC, Silver Spring, MD (US)

( * ) Notice: Subject to any disclaimer, the term of this patent is extended or adjusted under 35 U.S.C. 154(b) by 378 days.

(21) Appl. No.: 10/810,724

(22) Filed: Mar. 29, 2004

(65) Prior Publication Data

US 2005/0012621 A1    Jan. 20, 2005

Related U.S. Application Data

(60) Provisional application No. 60/457,647, filed on Mar. 27, 2003.

(51) Int. Cl.
*G08B 23/00* (2006.01)

(52) U.S. Cl. .................. 340/573.1; 340/5.2; 340/518; 340/528; 340/573.4; 705/5

(58) Field of Classification Search ............ 340/573.1, 340/573.3, 573.4, 574, 518, 528, 10.1, 10.52, 340/5.52, 539.1, 539.12, 539.13, 286.01, 340/572.1, 5.2, 5.1, 5.8, 5.86; 235/382; 705/1, 705/3, 5
See application file for complete search history.

(56) References Cited

U.S. PATENT DOCUMENTS

| 5,170,426 | A |   | 12/1992 | D'Alessio et al. |
| 5,461,390 | A | * | 10/1995 | Hoshen ..................... 342/419 |
| 5,731,757 | A | * | 3/1998  | Layson, Jr. .............. 340/573.1 |
| 6,437,696 | B1 |  | 8/2002  | Lemelson et al. |
| 6,463,127 | B1 | * | 10/2002 | Maier et al. ................. 379/38 |
| 6,509,829 | B1 | * | 1/2003  | Tuttle ......................... 340/10.1 |
| 6,674,367 | B2 | * | 1/2004  | Sweatte .................. 340/573.1 |
| 6,747,564 | B1 | * | 6/2004  | Mimura et al. .......... 340/825.6 |
| 6,867,683 | B2 | * | 3/2005  | Calvesio et al. ........... 340/5.52 |

* cited by examiner

*Primary Examiner*—Davetta W. Goins
(74) *Attorney, Agent, or Firm*—Merek, Blackmon & Voorhees, LLC

(57) ABSTRACT

The present invention is to an integrated end-to-end system and process composed of numerous application systems and subsystems (applicable in total or in subparts) which enables parties (such as businesses, buildings, prisons, governments, etc.) to acquire information (biometric and textual) regarding an applicant requesting entry, verify the acquired information—checking it against defined (e.g., government enforcement agencies) offender lists, and utilizing the acquired information at defined points in the process to track individuals. Further, the system preferably includes mandatory, scheduled check-ins to ensure compliance with the visitation requirements during the stay by the party in the sponsoring facility, country, business, etc.

22 Claims, 5 Drawing Sheets

INTELLIGENT CONTROLLED ENTRY-EXIT SYSTEM

This application claims the benefit of U.S. Provisional Application 60/457,647, filed Mar. 27, 2003, which is incorporated herein by reference.

BACKGROUND OF THE INVENTION

A. Field of the Invention

The present invention relates to a method and system for tracking individuals through a zone or a plurality of zones, requiring in a preferred embodiment that the individuals check in with the system to provide periodic status, location or compliance data.

B. Description of the Prior Art

In the post Sep. 11, 2001 America, there is a growing concern with the ability to track individuals including foreign visitors to the United States during their stay. Present processes have very limited automation and do not provide sufficient capabilities to initially verify an individuals intentions pre grant of entry, or the ability to track individuals post a countries'/prisons'/buildings'/etc. grant of entry stage. As such, enforcement authorities do not have readily accessible information available to commence location of an individual. The ICEE system provides a trail (depending on the governing authorities' selection of applied biometrics as well as check-in frequency assigned to the individual) of the individual's movements post granting of access, such that a valid name, address, phone number, picture, speech pattern, etc. is immediately available to commence location of an individual.

There does not appear to currently be any extensive, integrated system for tracking an individual or group of individuals from the time that they desire entry into a particular area or zone, track the individuals through voluntary check-in or through devices known or unknown to the individual, through the period of exit. And in the case of extended visas, it is not known until the end of the visa period whether the visitor intends to comply with the visa, at which point it may be too late to find the entrenched or hidden visitor. The present method and system described by the present invention provides such capability combined with the ability to track the status of the individual including outstanding warnings or alerts on the individual, including failure to comply with the voluntary check in requirements.

SUMMARY OF THE INVENTION

The present invention is accomplished by an integrated end-to-end system and process composed of numerous application systems and subsystems (applicable in total or in subparts) which enables parties (such as businesses, buildings, prisons, governments, etc.) to acquire information (biometric and textual) regarding an applicant requesting entry, verify the acquired information—checking it against defined (e.g., government enforcement agencies) offender lists, and utilizing the acquired information at defined points in the process to track individuals.

According to a preferred embodiment of the invention, an Intelligent Controlled Entry-Exit (ICEE) system is comprised of an integrated end-to-end system and process composed of numerous application methods (applicable in total or in subparts) which enables parties (such as businesses, buildings, prisons, governments, etc.) to acquire information (biometric and textual) regarding an applicant requesting entry, verify the acquired information—checking it against defined (e.g., government enforcement agencies) offender lists, and utilizing the acquired information at defined points in process to:

Validate the individual's initial information input against known accurate databases validating the information for accuracy and consistency (e.g., submitted names, addresses, and telephone numbers actually exist and align with each other, or submitted references actually exist, etc.), Assign a unique machine readable identification sequence for subsequent use by the individual and checkpoint authorities commence validation of identity processes, Retrieve the stored information at entry and exit checkpoints to validate that the individual requesting entry or exit is actually the individual they are stating to be, Monitor and track the individuals whereabouts on a programmatically defined frequency basis, using the biometric and textual information previously gathered to validate the individual's identity acquiring and storing acquired location (using location identification technologies [kiosk or IP addresses, CallerId (or Calling Name/Number Identification), etc.], time, date, etc. information for subsequent alerting transmissions and reports, Alert designated enforcement groups upon detection of biometric and textual inconsistencies during checkpoint processing, Provision of a computerized method for authorized parties to submit real time updates on individuals which will be made available to downstream checkpoint processes and users, Provide access to all data previously stored as a result of the individual's progression through the ICEE process such that reports on individuals or aggregate categories of individuals (e.g., categories: aggregated by dates, originating country, common locations, times, etc.) are graphically and textually displayed to provide intelligence data of individuals and groups of individuals that intend to defraud the ICEE process or the processes the ICEE process is put in place to protect.

The system utilizes computing and biometric technologies (a single or multiple array of biometric technologies are accommodated—including, but not limited to speech recognition, speaker verification, speaker identification, fingerprinting, image (photograph) matching and/or verification, retinal scanning, etc.) to be deployed or verified at each stage of the process. At the outset of the process, textual, speech and image (pictures and fingerprints or iris scanning) are acquired from the applicant and stored. A unique machine-readable number (utilizing barcode type technologies) can be assigned to the applicant and may be used for future validations of the stored information.

Upon granting the applicant entry authority, when the authorized applicant opts to enter an authorized country or location they are confronted with an entry checkpoint (e.g., guards in buildings, or Customs officials at airports or seaports). The official's machine reads the machine-readable number and the entry applicant's information (biometric, textual, etc.) is accessed and used to verify that the applicant is who they say they are.

Assuming entry is authorized, date, time, location, etc. of the entry point is recorded (updated) against the entry applicant's already stored information. At this time, a scheduled check-in frequency is initiated such that the now allowed entry applicant must check-in at a designated time.

The means by which the now allowed entry applicant checks-in is through pre-assigned telephone numbers (e.g., "800" number, IP addresses, or kiosk identifiers, etc.), which perform speech verification of the user using the unique machine-readable number which is input by the applicant. It is envisioned that these telephone numbers or equivalent means oftentimes will be assigned specific languages to more readily communicate with callers (e.g., Russian, Japanese, Spanish, etc.). The call itself, with time and location information (using calling number identification), as well as any results of the speech verification tests are recorded (updated) against the authorized entry applicant's already stored information. In the event of verification failure an alert is sent to system enforcement authorities. In the event the authorized entrant does not check-in in the pre-designated timeframe, the date and time of the infraction are recorded (updated) against the authorized entry applicant's already stored information and an alert is sent to enforcement authorities.

Upon the authorized entry applicant's desire to leave the entry-exit controlled environment, they are once again confronted at an exit checkpoint (e.g., Customs officials at airports). At this point the exit official gains access to previously stored information, validating the textual/biometrics, and determines whether the exit requester should be granted egress or whether enforcement activities should be undertaken due to check-in, etc. infractions during their stay.

Throughout the process alerts may be transmitted against individuals and/or groups of individuals by authorized users of the ICEE system. These alert updates are then made immediately available for use by downstream users of the system to aid in the granting of access/egress and/or the need to call in enforcement authorities.

Further, all stored information of individuals is searchable and filterable allowing authorized system users to develop individual and aggregate custom reports of individual/group movements, statistics, etc. while under the control of the ICEE system.

Accordingly, it is a principal object of the invention to provide an integrated system capable of tracking individual's stay in a building, restricted facility or geopolitical zone.

It is another object of the invention to provide means to verify the information by using biometric, graphic and/or textual information to confirm the origin or source of information and/or to compare the information against prior, current or future information contained regarding the individual, especially offender lists and the like.

It is another object of the invention to provide discrete identifiers for individuals or groups of individuals verifiable by secondary information such as biometrics to uniquely identify individual independent of (or to validate) documentary evidence capable of being falsified.

It is a further object of the invention to provide systematic and controlled information entry points to further verify the information through third party and external sources.

Still another object of the invention is to provide a tracking and warning system capable of identifying individuals or groups of individuals, and providing current compliance status and other warning or alerts regarding the tracked entities.

It is yet another object of the invention to provide compliance and tracking data on subject entities by requiring programmatically-defined frequency basis check in requirements which can be verified by the tracking system.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT(s)

The present invention is directed to a system and method of tracking individuals or groups of individuals through a restricted area or geopolitical zone, such as in the preferred embodiment, foreign nationals entering the United State, for the purpose of identifying, tracking and ensuring compliance with restrictions placed on such individuals.

In the preferred embodiment as best described in reference to the figures, an intelligent controlled entry-exit system (ICEE) consists of a number of permanently or selectively linked components that preferably communicate over a number of networks, including the telephone system (e.g., one or more PSTN or PBX) and the Internet. The system broadly consists of an initial registration of an individual, the assignment of a unique identifier to the individual, the collection of biometric and other data on the individual, associating the information with the identifier, verification of the information through secondary sources, and as necessary entering additional information and warrants/alerts and other status information into the individual's file for use by authorized parties. At the entrance to the controlled area, the individual's information and identity is verified, entrance is allowed, and a periodic "check in" schedule is provided to the individual. During the stay, the individual uses authorized available or specialized equipment to update location and/or status information which is verified by the system. On exit, the compliance and/or status of the individual is checked to authorize exit of the individual from the controlled area.

In more detail, FIGS. 1A–1D show a flow chart of a system according to a preferred embodiment of the invention:

Application Management

Figure 1A:
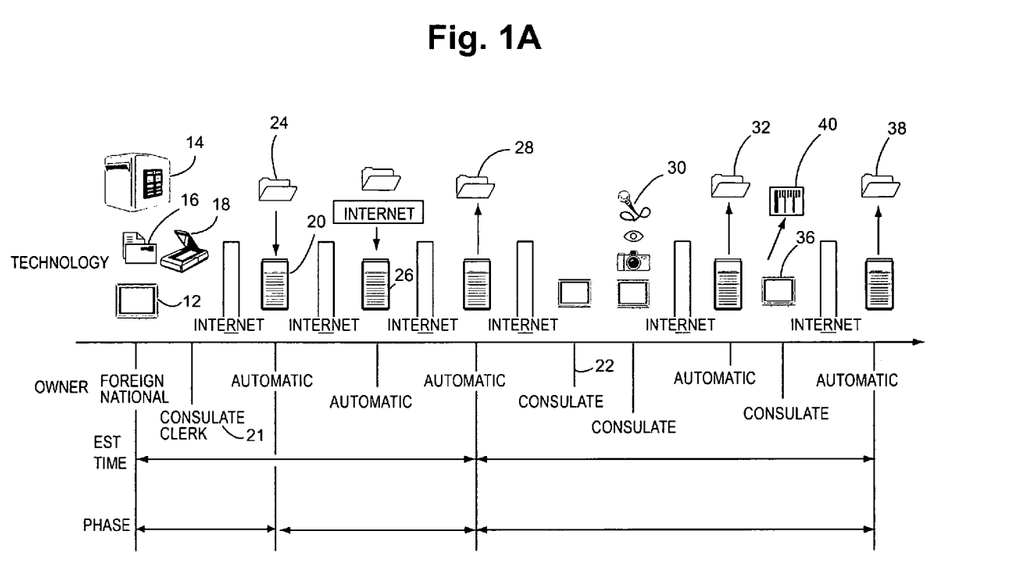
FIG. 1A is a diagrammatic view of the components of an intelligent controlled entry-exit system application management according to a preferred embodiment of the present invention.

When an individual such as a foreign national (FN) desires entry into the United States or other controlled area such as a prison or government facility, the FN must be initially registered with the system, if data on the individual is not already available. This can be accomplished through various methods including electronic applications available on the internet from the FN's home computer 12, a kiosk 14 provided at an airport, consulate, post office or appropriate facility (not shown), or by manually submitting an application 16 which can be entered by hand or preferably scanned using OCR 18 or similar technology into a central computer 20 by a consulate staff clerk 21. One skilled in the art will recognize that one central computer or facility may be used for all processing and computing or the facilities and computing can be distributed to multiple computers and facilities that are directly, indirectly, intermittently or selectively connected or aggregated without departing from the scope of the invention.

Preferably, the FN applies at a United States consulate 22 in the home country of the FN. The information regarding the FN is then assembled into a central data file 24 associated with the FN, preferably by assigning the FN a unique identifier ("FNId") which may be the same as the FN's passport number, visa number, social security number or a unique number determined by the computer or operator. The file may be maintained on the central file and/or another computer memory for later retrieval and access by authorized personnel. These personnel may be in the same department as the consulate, or may be other law enforcement or similar persons.

The data file or folder 24 associated with the FN may be updated with information already residing in the database(s) 26 of the ICEE or within other branches operating in cooperation with the ICEE, such as CIA, FBI, Department of Homeland Security, IRS or similar agencies. With the placement of treaties, it may also be possible to retrieve or receive information on the applicant ("FN") from the home country of the FN or from other authorities within or outside the treaty. Additionally, consulate personnel 22 tasked with interviewing or otherwise processing the application of the FN may also collect and enter data associated with the FN as shown at 28. The data may be screened, parsed, secured, encrypted or edited by authorized personnel as necessary to promote and carry out the goals and needs of the authorized agencies.

To verify the unique identity of the applicant, the consulate personnel or other authority processing the application may take biometric 30 or other identifying information on the applicant. The biometric data may be used to identify the applicant or as a base to later verify or identify the FN while in the controlled area or while the FN is seeking entry or exit from the area. This biometric and identifying information may include fingerprints, palm prints, retinal scan, voiceprint data, photographic information or other similar information that can be used to uniquely identify an individual. It may also include textual or documentary evidence such as passcodes, passwords, question-answer tests (e.g., "what is your mother's maiden name?"), birth certificates or other verifying information. This information 30 can be stored electronically in the same or related files with the same or different security access, as one skilled in the art would appreciate or can be stored in other forms such as magnetic memory (e.g., tape recordings) or paper form (e.g., photographic paper). Preferably the information is electronically stored in the folder with the FN's other data as shown at 32.

Using the data 24 of the FN as updated as described above and using other standard criteria, the consulate clerk 22 or other appropriate personnel can make an informed decision (at 36) whether to grant or deny the FN a visa, or proceed the FN to the next step in visa or entry authorization, or request additional information as necessary to make the decision. The decision and/or processing of the FN can be stored or used to augment the file (at 38) of the FN to document the processing and any decisions made or change in status of the FN or FN's application.

Once the data file exists on the FN, enforcement authorities 50 (FIG. 1B) or other authorized parties may update the ICEE data file 24 as necessary (as shown at 52) or the ICEE computer may poll other databases 26 or other parts of its database to cull data on the FN to update the FN's file. The data can be commingled and updated or held until approved, entered or accepted by a reviewing or authorized party.

If an entry visa is granted or authorization of the FN to enter the United State is granted, the file of the FN is preferably updated to show such entry. Additionally, an OCR strip or bar code or similar device may be used to print or affix an identifier onto the visa or passport or other identification usable by the FN so that the identifier can be scanned or otherwise read into a computer to identify the FN. The identifier may be the code (FNId) assigned to the FN by the ICEE or a pointer to the FN file or otherwise associated with the FN. For example, scanning the normal passport bar code into a computer may link the passport number to the FN's file. However, in the most preferred embodiment, the FN identifier ("FNId") is printed directly onto the passport or a label attached to the passport as a bar code 40 or other machine readable text or graphic at the time of application or at the time of entry approval for later scanning by customs or other officials to quickly access the computer files of the FN.

Entry Management

Figure 1B:
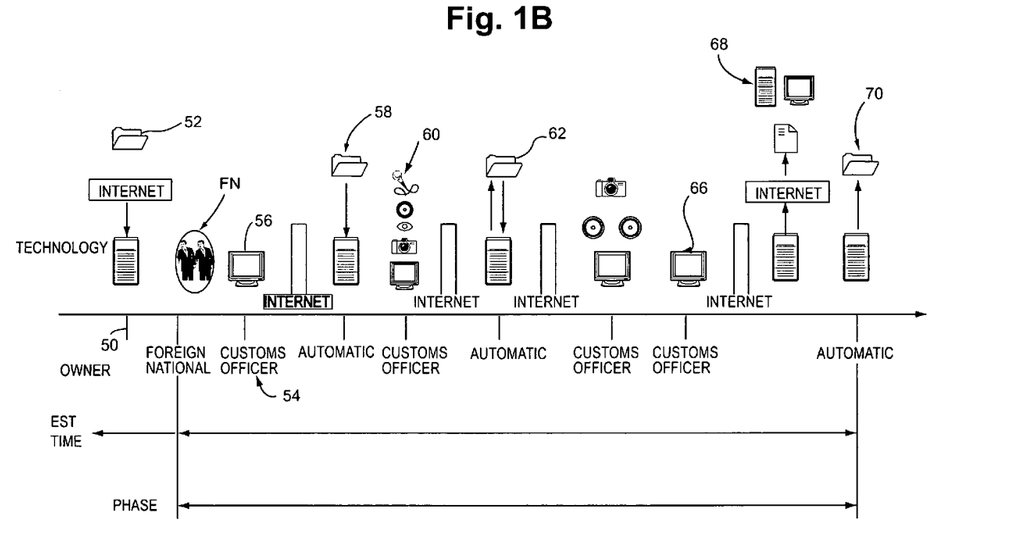
FIG. 1B is a diagrammatic view of the components of an intelligent controlled entry-exit system entry management according to a preferred embodiment of the present invention.

After the entry visa or other approval is obtained by the FN, the FN may proceed to the Entry phase of the visit (FIG. 1B). While the application phase may be conducted at a number of places with the FN in contact with authorized personnel or remotely therefrom, it is envisioned that the entry phase of the ICEE processing can only take place at a limited number of access points to the controlled area. In the case of the preferred embodiment, where the controlled area is the United State, the customs stations 54 of the US at airports or other ports of entry are envisioned to be in control of the entry phase. Additionally, personal presentation of the FN would be necessary to carry out the entry phase.

When the FN approaches a Custom's official 54, the FN will present his passport or similar document to the Custom's official. The Custom's official will scan the passport, preferably using the bar code 40 printed or attached to the passport by the Consulate Clerk 21. The Custom's official can then retrieve the computerized records (at 58) of the FN for identification and verification. The verification may be to check that a visa or entry authorization has been granted and listed in the computer file (at 56). The identification may include taking biometric data (60) (fingerprints, optical scan, photocomparison, voiceprint, etc.) of the FN and comparing it to biometric data maintained in the ICEE (at 62). The identification may be limited to verifying that the FN presenting the data is the same as the FN associated with the data file, or it may be used to identify "who" the FN is by matching the biometric to the FN using a biometrics database. In other words, if the FN does not match the documents presented, it may be necessary to scan the broader database to determine the identity of the FN. In this instance, it may be necessary to check external databases such as CIA, FBI or other databases if the FN is not listed directly in the ICEE. This may be automatic or require the assistance of various authorized personnel. Additionally, if a match is incomplete, authorities may be notified (at 66) or additionally qualifying or identifying data may be taken to assure the identity of the FN.

If the biometrics successfully match the FN's saved data 24, the Custom's official can use the data to which he has access through the ICEE to supplement his normal processing of foreign nationals to grant or deny entry or request further information or processing.

Additionally, depending on the level of matching and/or not-matching, automated alerts and overrides may be used to alert (at 68) enforcement personnel, the custom's supervisor or other authorized personnel. This may be used to prevent the Custom's official from making an autonomous decision, to supplement the decision making of the Custom's official, or to provide an alert in case the Custom's official is threatened or bribed into granting entry when entry is unwarranted or unwanted. The warning may be provided to a local office or to a remote location by electronic messaging (e.g. e-mail or instant messaging) or by other appropriate mechanisms such as lights, sirens, etc. The response could also be in the form of gate or door closings, locking or other appropriate measures to secure the area or bar entry from one area to another or to secure personnel.

Once entry is granted or denied, the data file 24 of the FN can be updated (at 70) to show the grant status, entry status or to start the period of stay counters, for instance to initiate countdown of a 30 day stay visa. This update may be manual or automatic.

Stay Management

Preferably at some point prior to entry or upon entry, the FN is interviewed and instructed on check-in requirements during the stay (at 80, FIG. 1C) or receives pamphlets or other instructions regarding stay requirements. Preferably the instructions are on a business card sized sheet sized to fit in the wallet or pocketbook of the FN. The instructions should be in English and/or a language chosen according to the requirements of the FN or based on the origin country of the FN. The check-in requirements are an important part of a preferred embodiment of the invention. While tracking devices, bugs, or other devices known or unknown to the FN can be used to track and verify the whereabouts of the FN, it is preferable that the FN is required to check-in voluntarily during his stay to verify his location and whereabouts and to show voluntary compliance with the stay requirements.

The check-in instructions may provide various levels of requirements depending on the risk of the foreign national and other political considerations. The check-in may be at a fixed interval such as daily, weekly or monthly, or may be at random intervals. The intervals for the entire trip may be provided at the beginning of the stay to the FN, or the next check-in or next several check-ins may be provided to the FN during the previous check-in. A toll free number may be provided for check-in or for information regarding check-in requirements.

Figure 1C:
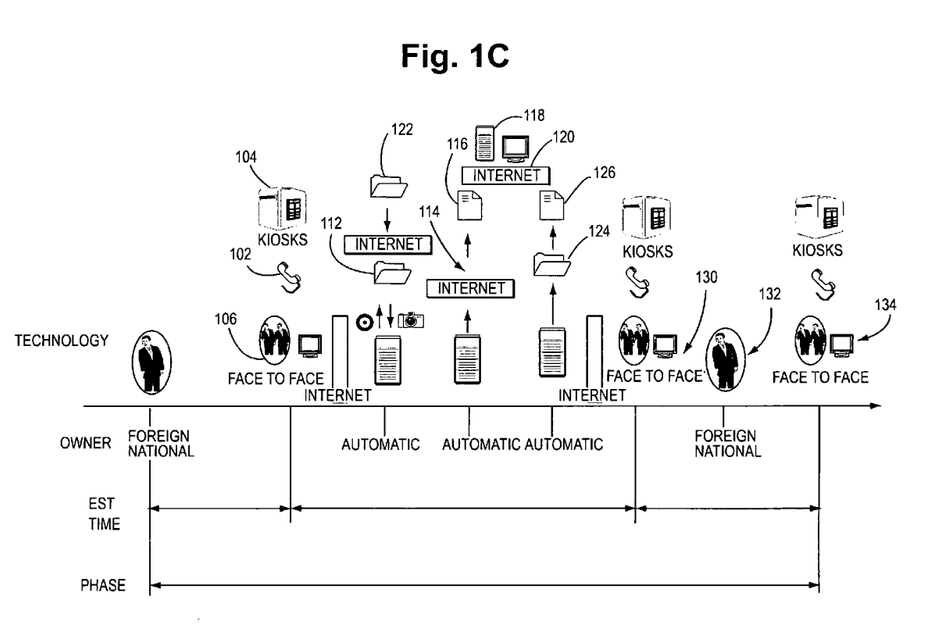
FIG. 1C is a diagrammatic view of the components of an intelligent controlled entry-exit system stay management according to a preferred embodiment of the present invention.

Levels of check-in verification may be provided according to the need to track the FN. The minimal level check-in is predicted to be the telephone call 102. While any telephone or cellular telephone could be used to access the ICEE, it is preferred that only qualifying telephones be used for check-in. A qualified phone would be a trackable and "soft" line, having a human owner that could later be queried about the FN's use of the line. Such a qualified phone could be at a hotel, a government agency, or the like. A non-qualified phone (using technology currently available) might include a payphone or a cellular or radio phone, whose accuracy and location might be subject to falsification. Since the telephone is used to track the whereabouts, a fixed land line is preferable to a moving cellphone.

Once connected by telephone, further verification of the FN may be required. Preferably the FN enters his unique identifier using voice recognition or touch tone keys on the telephone to initiate the process. Once the identifier number is entered, the ICEE system retrieves the data file of the FN and any updates thereto, including biometric data for further verification of the FN's identity.

During this process, the ICEE verifies that the CallerID or other call origin identifying information is related to a qualified call origin, such as a business, telephone, or licensed or government facility. If the calling origin does not qualify, the FN is informed by automated message or transferred to an operator for further assistance and/or instructions. Additional time may be provided to the FN to find a qualifying communication instrument.

Once the initial requirements for the check in are met, further verification of the FN may take place. Preferably this takes the form of voice recognition/voice print verification 112, though other biometrics could be used. The FN may be asked to repeat a number of phrases in random order that the FN previously recorded for the ICEE. The question and answers (e.g., "what is your mother's maiden namer?") provided at the time of application or during an interview may also be used as verifying data.

Additionally, the FN may be asked for additional information such as current location that can be verified by caller id or other automated location data. Additionally, the FN may be asked about his future travels or other information to bring the ICEE up to date. Warnings or other recordings or operator communicated data may also be provided to the FN, such as a warning for missing a previous check-in or warnings about locations that the FN should avoid, etc. The FN can also be provided with the next check-in time or requirement. Information about the status of the FN stay such as extension grants or time remaining on the visa or other government messages can also be provided automatically, by a human operator, or conditionally based on input selections by the FN.

A second level of check-in that may be required if telephone check-in is considered defeatable or insufficient, would be kiosks 104. These may be provided at post offices, bus stations, air ports, or other government or non-government facilities to facilitate nationwide check-in as the system grows. The kiosk may be connected by the internet or other suitable network or telephone dialup system or the like. The kiosk may provide equivalent data to the telephone system while having uplinkable geographic and time information that is more secure than the telephone system. Additionally, the kiosk system may utilize advance biometrics not available over the telephone such as a retinal scanner, a FNId code scanner, a passport scanner, a fingerprint scanner or the like. Since the kiosks are preferably government operated and controlled, or combined with licensed operator machinery, it is more likely to provide accurate and verifiable information to the ICEE. The kiosk can also provide textual or graphical feedback information to the FN as necessary on the status, the requirements of the next check-in, or other government information. Additionally cryptography or otherwise secured transmission of the data may also be incorporated into the transmission of data to the ICEE to protect the privacy of the FN. A printer may also be attached to provide the FN with a record of the communications or next check-in requirement.

In the event that check-in information needs to be verified by a human operator, the FN may be required to check in with government personnel or others authorized to verify information, such as airport personnel, a licensed facility such as hotel or shopping mall station or the like. This face to face interview 106 may be used in conjunction with the kiosk or telephone, or separately therefrom. The FN may be required to show up at a place and time or at a facility designated for such purpose, such as a post office. The facility preferably has equipment for taking biometric information from the FN and for otherwise supervising the check-in process of the FN. Additional interviews of the FN on his activities and/or future plans can be taken as needed. The supervisor of the facility may also retrieve identifying information from the FN such as the FNId and use the FNId to retrieve the computerized records of the FN to determine at least the check-in requirements for the FN, or any warrants and alerts regarding the FN.

The purpose of having a "soft" check-in point such as hotel clerk, a manned kiosk or a government agency is to aid in picking up the trail of a FN that fails to comply with the check-in requirements. In the past, at the end of a six month visa, if the FN fails to show up, then the authorities have no idea where the FN "jumped" and how far back to begin tracking. With the ICEE in place, not only is there a more finite time stamp on when the FN quit complying with the stay requirements, but there are set people to interview about the FN or to verify that in fact that it was the FN at the last check-in point.

If any of the FN identifying or verification information does not match the ICEE data, or the location data is inconsistent with the authorization of the FN, then an alert (at 114) may be sent to authorities along with the location of the FN to apprehend or further question the FN. Alternatively anomaly reports or standard reports 116 may be generated to track, record, or consolidate check-ins for review by the appropriate authorities. These reports may be printed at a local site or forwarded electronically to a remote location or to a remote agency 118 by the Internet or appropriate network 120 or link.

At the time that the FN checks-in or independent of the FN's activities, the file of the FN can be updated automatically, periodically or manually based on internal or external data (at 122,124). The new data or a comparison of this data with the old data can cause the automatic transmission of messages to the FN or the authorities, the transmission of alerts to the FN or the proper authorities, or transmission of reports 126 to local or remote facilities. Additionally the check-in requirements or their frequency may be controlled or changed in response to the new FN information obtained from the FN or from other data updates or data comparisons and processing. Additionally, the check-in requirements for the FN may be changed for other reasons such as policy decisions, the current location of the FN, the time before the expiration of the entry visa of the FN or any domestic or world events.

Preferably before the conclusion of the check-in, the FN is provided with information 130 regarding any further check-in requirements, their level and time or date. The date and time, CallerID number, address of the call origin, biometrics used to verify the identity of the FN, and other records of the verification and check-in session is then parsed and recorded as an update to the data file of the FN. A number or facility may be provided to aid the FN in tracking (132) the next check-in requirement or for requesting an extension in advance, etc. The process of checking-in is then repeated (134) during the next check-in by the FN.

Figure 1D:
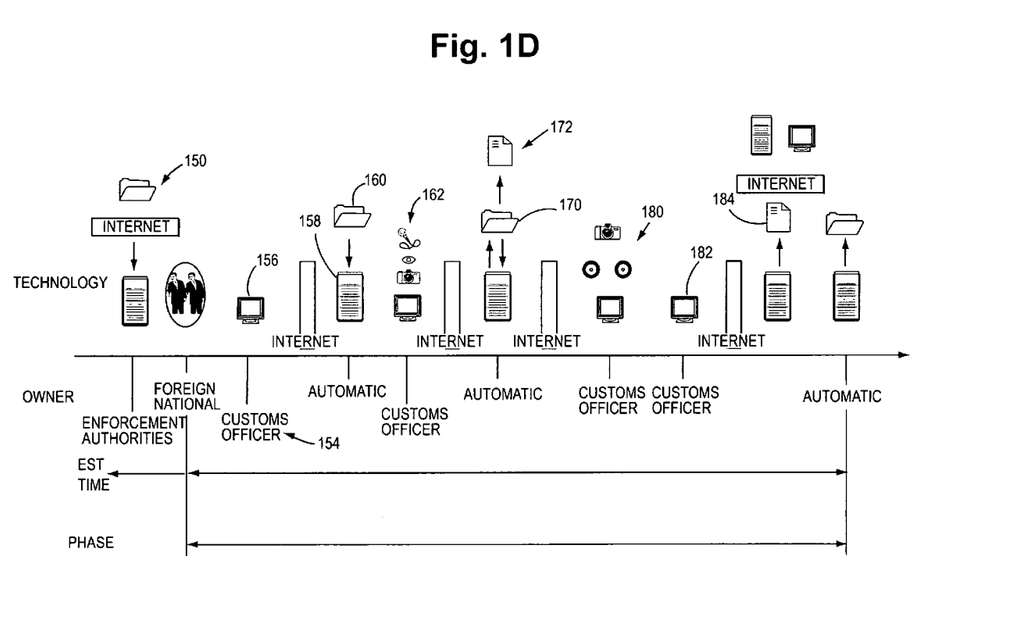
FIG. 1D is a diagrammatic view of the components of an intelligent controlled entry-exit system exit management according to a preferred embodiment of the present invention.

Should the FN fail to check-in within the scheduled time period or fail to qualify with the verification during check-in, an alert, report or notification is automatically sent to the appropriate authorities or tracking agency. In addition to check-in frequencies, an overall time of stay monitoring sequence is being performed—automatically notifying controlling authorities of overstay Exit Management At the conclusion of the stay of the FN, the FN must be processed for exit from the United State. Since there has been some interval of time since the last check-in, the data file 24 of the FN may be updated (at 150) with new data as discussed above.

When the FN appears at a controlled exit port, a customs officer 154 or suitable official scans the printed FNId of the FN into a computer 156 or otherwise access the electronic records of the FN using the FN's visa number, passport number or other identifying information. The customs officer then has at his disposal all of the contained information on the FN including compliance with stay requirements, advisories, alerts, and verification information. One skilled in the art would appreciate that access to some or all of the information could require passwords, security levels or authorization that would prevent this customs officer 154 or other personnel from accessing parts of the information contained in the database, especially if the ICEE database was a shared database between different agencies or contained information culled from other agencies.

Upon scanning of the FNId or on manual or automatic request, the ICEE server 158 requests a current update on the file of the FN or sends a status change to update (at 160) the FN file to show that exit authorization has been requested. The request may trigger automatic or periodic reports or alerts to various local or remote personnel.

The customs officer 154 may also request verifying information to verify that the documentation presented by the FN is associated with this particular FN. This verifying information make take the form of biometrics 162 or other information such as textual question and answers (e.g., "what is your mother's maiden name?") that can be verified from the FN's electronic file or a portion thereof. The verification information can then be manually and/or automatically verified 170 with the information contained in the FN's file. As discussed above, the matching or non-matching of the FN's data with the electronic file may cause a report 172 to be issued, an alert or alarm to be transmitted, or other automatic responses such as a siren or flashing light or security procedures to be initiated. Additionally, the ICEE system may wait for a response by the customs officer before initiating these responses. If the customs officer's response is inconsistent with the ICEE guidelines, such as for example allowing exit of the FN when the biometrics fall below a certain match level, the customs officer's supervisor may be notified 182 by the ICEE, or the customs officer may be barred from unlocking a turnstile, gate, door other security device. In this manner, the ICEE can be used to verify compliance of the customs officer with applicable guidelines and policies.

Once the biometrics verification 170 has taken place, the customs officer can use all of the data available to him along with the normal policies and procedures in place to decide whether to grant or deny exit authorization 180 or whether to further process the FN at that station or send the FN to a different station for further processing. The FN may also alert the appropriate authorities (at 182) or his supervisor, etc. in response to the biometric verification test, other standard policies and procedures, alerts generate by or existing in the ICEE database, or for other reasons. The FN may also be granted authority to update the FN's file based on personal observations or with other required or optional data, which may trigger alerts, reports, notifications or security responses.

As the information in the ICEE is updated by the biometric test, by input by the customs officers or other automatic or manual updates, the reports and notifications 184 may be reviewed by other departments or authorized personnel in real time. The reports and notifications may result in notifications and/or alerts being sent back to the customs officer 154 through the ICEE or other communication devices (not shown) to cause the customs officer to allow or deny exit authorization or to hold the FN for further processing. One skilled in the art would also recognize that that these actions could be implemented separately or independently by other personnel such as police, guards, or militia that are near the customs officer that are more qualified to handle such detention or to have the action performed at a location remote form the customs officer and other persons in the customs area.

Once processing of the exit authorization has been completed, the FN's data file can then be updated. If the FN is exiting the United State, the file may be effectively closed or archived (but preferably not necessarily deleted and/or erased) to show that further check-in requirements are not needed. This information may be transmitted to the home country of the FN or to other appropriate departments within or outside of the controlled area.

Data Verification and Control

An unique advantage of the intelligent control entry exit (ICEE) system, is the ability to integrate internal and external databases to increase the quality level of information screening for the FN. One such quality improvement area is in checking address, telephone and sponsor information provided by the FN. During the application process, or at any other phase in the ICEE process, the address, telephone number or other data provided by the FN may be cross-checked against other existing or developed databases.

For instance, the telephone number may be parsed and/or checked to determine whether the exchange or number is consistent with the city (or state and country) and zip code given for the address of the FN. The number can also be checked against residence or other information given by the FN during previous interviews or as contained for the FN in the ICEE or other available databases. For example, if a Spanish national (SN) were seeking entry to the United State and listed a first home address and telephone number, the number could be checked against a second home address and telephone number in the database from information obtained in cooperation with the Spanish police department or telephone agency. While a mismatch is not necessarily indicative of mal intent on the part of the SN, it may denote that further information, verification or interviews are necessary. This ability to cross-check multiple databases for inconsistent information on an individual will continue to increase as the Internet brings about global harmonization of computing and the ability of computers to scavenge and cull data from diverse database through cooperations, treaties, and availability.

The ICEE may be used to cross check inconsistencies with other databases as they arise. For example, photorecognition cameras have been installed in cities and localities which recognize or attempt to recognize faces in a crowd to spot individuals on offender lists or for use after the fact to identify perpetrators or individuals causing problems. The ICEE could in the future be merged with such databases to further track individuals (e.g., FNs) or to at least verify consistencies between check-in locations and other locations where the FN was spotted. For example, if a South Miami camera placed an FN in South Miami at 10 am and the FN calls in from California at 11 am, then this data would be inconsistent and further interviewing of the FN may be warranted.

Additionally, although it is often the practice that a FN is required to have a sponsor in the United State, such as an employer, school association, institutions, hospitals, or other sponsor, there is little ability of the interviewing customs officer to be able to verify the information. The ICEE by maintaining various databases or by having external databases available to it, can verify information provided by the FN for inconsistencies. For example, if the FN lists the University of North Carolina as the sponsor institution and "engineering" as the area of study, the ICEE would be able to recognize that the university does not have an engineering school and would reject the information or notify the appropriate personnel that the information is inconsistent and that further information should be taken.

By tracking the number of inconsistencies and other patterns in a database, it will be easier to make intelligent judgments about the intent and risks associated with the FN, instead of having to wait to the end of a six month visa to find out if the FN intends to show up at an exit point in compliance with the visa.

As discussed briefly above in the exit management, the ICEE can also be used to store rules, procedures, logic or decision trees for use by authorized personnel such as the customs agent 154 in processing the FN. This logic can be carried out by the personnel and/or by the ICEE program. For instance, if the FN fails a biometric test (e.g, fingerprint verification) and a question/answer test (e.g, "what is your mother's maiden name?"), the ICEE may inform the customs officer 154 to call his supervisor or implement a secondary biometric test such as retinal scan. The ICEE program may also send a parallel alert to the supervisor or a remote authorized personnel who can review the decisions made by the customs officer 154.

Reports and Data Analysis and Real Time Alerts

One of the unique advantages of computers and databases is the ability to manipulate the data in nearly endless combinations to study trends, groupings and intersections. While it is not possible here to list all of the reports available using the ICEE system, several reports are listed below as examples of advantages of the system:

1. A report or graphic can be generated representing the path of the FN during his travels can be shown as an overlay of a facility, city, state, or country or other geopolitical map.

Figure 2:
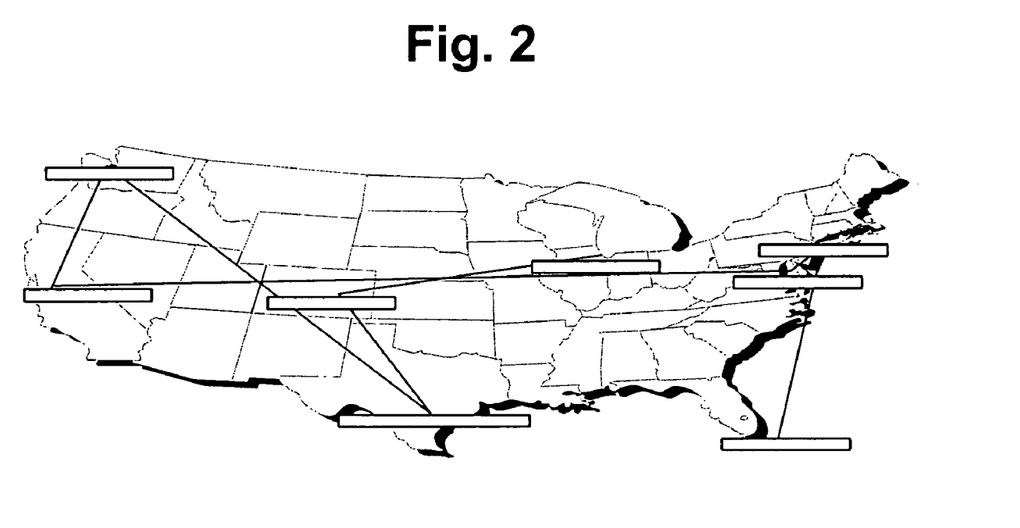
FIGS. 2 and 3 are examples of graphical reports generated by the ICEE according to an embodiment of the invention.
Figure 3:
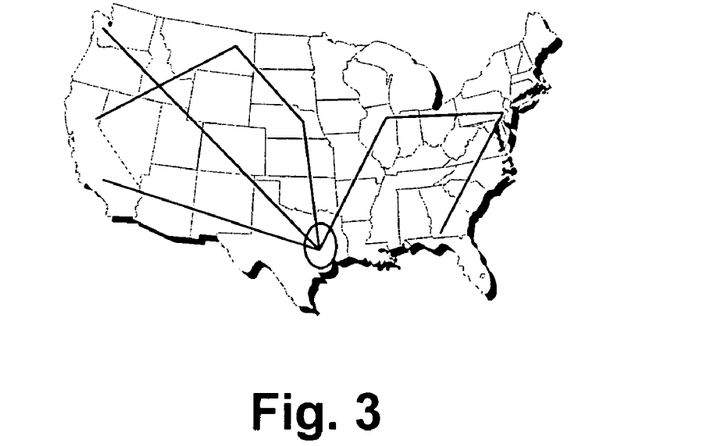

2. A report or graphic can be generated showing the overlapping travel of various FNs or groups of FNs, preferably as an overlay onto a map of a facility, city, state, country or other geopolitical map. See FIGS. 2 and 3. FIG. 2 shows an example of plotting of movement of a single alien (FN) based on CallerID and V&H coordinate plotting, which portrays details such as place or origin by date, telephone number and address of telephone number. FIG. 3 shows a similar mapping for multiple FNs.

This report can be used to show or suggest what combinations of tracked individuals are coincidently in the same location at the same or different times. The report could be generated by particular FNs, by groups of FNs sharing common characteristics such as country of origin, security risk level, or other factors. The report could also be generated to show FNs at a particular city or facility, or at cities or facilities having particular characteristics such as power plants, political targets (e.g., museums or government buildings), or vulnerability levels (e.g., nuclear power plants).

3. A report or graphic can be generated showing travel patterns of a FN or groups of FNs to show similar travel patterns according to characteristic of the FN or groups of FNs.

4. A report or graphic can be generated showing behavior patterns of a FN or groups of FNs to suggest or predict when FNs are likely to discontinue compliance with the stay requirements. For example, if an FN begins to wait later and later in the day to check-in and starts to call in for extension, it may be shown that the FN is likely to discontinue check-ins and thus should be required to check-in more frequently or at a more secure location.

5. A report or graphic can be generated showing changes in the above reports, such as changes in FN population of a particular city, or changes in travel or behaviour patterns of groups of FNs.

Not Limited to Geopolitical Zones

While the above preferred embodiment shows tracking of foreign nationals throughout the United State, the invention is not limited to such an embodiment. The ICEE could be used to track parolees on probation following incarceration without departing from the scope of the invention. The ICEE could also be used to track individuals, employees or visitors within a facility such as a prison, nuclear power plant, or government facility such as the Savannah River Plant. The tracked persons could be assigned telephones, GPS devices or other tracking tools to simplify the tracking process. The ICEE could be used to poll or call the individuals for verification as well as or in place of having the individuals check-in. The polling or ICEE initiated calls could be scheduled or at random times. The ICEE may ask question/answer tests (e.g., "what is your mother's maiden name?") or the tracking devices may incorporate biometric capabilities such as fingerprint or retinal scanning or voice printing may be used.

It is to be understood that the present invention is not limited to the sole embodiment described above, but encompasses any and all embodiments within the scope of the following claims.

The invention claim is:

1. An stay management system for managing the stay of a visitor to a first zone, comprising:
   a) at least one computer for managing data collected by the stay management system;
   b) at least one entrance for the first zone having a data entry point for entering data associated with the visitor and communicating said data to said stay management system;
   c) at least one communication device in communication with said stay management system for communicating data about the visitor during the visitor's stay in the first zone; and
   d) at least one exit from the first zone having a data entry point for entering data associated with the visitor and communicating said data to said stay management system;
   e) a scanner located adjacent said at least one entrance of said first zone for scanning machine readable indicia to access information stored in said computer about the visitor;
   f) a scanner located adjacent said at least one exit of said first zone for scanning machine readable indicia to access information stored in said computer about the visitor;
   g) means for providing a signal to a predetermined individual that another individual is allowing a visitor to enter or exit the first zone in an instance where the visitor should not be allowed to enter or exit the first zone.

2. A stay management system for managing the stay of a visitor to a first zone, comprising:
   a) at least one computer for managing data collected by the stay management system;
   b) at least one entrance for the first zone having a data entry point for entering data associated with the visitor and communicating said data to said stay management system;
   c) at least one communication device in communication with said stay management system for communicating data about the visitor during the visitor's stay in the first zone; and
   d) at least one exit from the first zone having a data entry point for entering data associated with the visitor and communicating said data to said stay management system;
   e) at least one telephonic check-in device located in said first zone which the visitor is required to use to check-in during the visitor's stay in the first zone; and,
   f) means for verifying that the visitor used the at least one telephonic check-in device when the visitor checks-in.

3. A method of monitoring at least a first visitor in a first zone, the first zone having at least one entry point and at least one exit point, said method comprising the steps of:
   a) obtaining information concerning a first visitor desiring entry into a first zone prior to entry of the first zone by the first visitor;
   a) providing at least one computer having a memory;
   c) assigning the first visitor with a unique identifier distinguishing the first visitor from at least one other individual;
   d) storing in the memory information concerning the first visitor;
   e) associating the information concerning the first visitor stored in the memory with the unique identifier;
   f) setting at least one stay requirement that the first visitor must satisfy while in the first zone;
   g) updating the information concerning the first visitor stored in the memory during the first visitor's stay in the first zone to indicate whether the first visitor has complied with the first stay requirement; and,
   f) at the time the first visitor seeks to exit the first zone, checking the memory to see if the first visitor has complied with the at least one stay requirement.

4. A method as recited in claim 3, further including the step of:
   a) providing a signal to a predetermined individual informing the individual that another individual is allowing a visitor to enter or exit the first zone in an instance where the visitor should not be allowed to enter or exit the first zone.

5. A method as recited in claim 3, further including the steps of:
   a) providing a check-in device in the first zone; and,
   b) requiring the first visitor to use the check-in device at least once during the first visitor's stay in the first zone.

6. A method as recited in claim 5, including the further step of:
   a) verifying that the first visitor is using the check-in device when the first visitor checks-in.

7. A method as recited in claim 6, wherein:
   a) the check-in device is a telephone.

8. A method as recited in claim 7, including further step of:
   a) processing the telephone call to determine whether the first visitor is using the check-in device when checking-in.

9. A method of monitoring at least a first visitor in a first zone, the first zone having at least one entry point and at least one exit point, said method comprising the steps of:
   a) obtaining information concerning a first visitor desiring entry into a first zone prior to entry of the first zone by the first visitor;
   b) providing at least one computer having a memory;
   c) assigning the first visitor with a unique identifier distinguishing the first visitor from at least one other individual;
   d) storing in the memory information concerning the first visitor;
   e) associating the information concerning the first visitor stored in the memory with the unique identifier;
   f) providing at least one check-in device in the first zone; and,
   g) requiring the first visitor to use the check-in device at least one time during the first visitor's stay in the first zone.

10. A method as recited in claim 9, including the further step of:
   a) updating the information concerning the first visitor stored in the memory during the first visitor's stay in the first zone to indicate whether the first visitor has used the check-in device during the first visitor's stay in the first zone.

11. A method as recited in claim 10, including the further step of:
   a) providing an individual at the location of the check-in device; and,
   b) interviewing the individual located at the check-in device to track the first visitor.

12. A method as recited in 9, including the further step of:
   a) verifying that the first visitor used the check-in device when checking-in.

13. A method as recited in claim 9, wherein:
   a) the check-in device is a kiosk.

14. A method as recited in claim 9, wherein:
   a) the first zone is the United State, the visitor is a foreign national and the check-in device is a qualified telephone.

15. A method as recited in claim 14, including the further step of:
   a) utilizing call origin information to verify that the foreign national used the check-in device when checking-in.

16. A method as recited in claim 9, including the further step of:
   a) verifying that the first visitor is the person checking-in when the first visitor checks-in.

17. A method as recited in claim 9, including the further step of:
   a) verifying that the first visitor is the person checking-in through biometric information.

18. A method of controlling access to a zone, comprising:
   screening potential visitors by receiving predetermined user documentation regarding the identity of a user desiring entrance to the zone from the user;
   validating the identity of the user by comparing the documentation and the user to information pertaining to the documentation and the user in a database;
   retrieving additional secondary information pertaining to the user maintained in a database to qualify or disqualify the user from entrance to the zone;
   determining whether to grant entrance of the user to the zone based on positively validating the identity of the user and based on the additional secondary information retrieved for the user;
   verifying user supplied information regarding purposes for the user entering the zone, said user supplied information selected from the group of reasons for visiting the zone, particular locations in the zone to be visited by the user, and contact information of sponsors to visit in the zone; and
   selectively allowing the user to enter the zone only after positively determining to grant entrance of the user to the zone and positively verifying user supplied information.

19. The method of claim 18, further comprising a supervisory computer analyzing information in the database and comparing it to the user documentation and disallowing the user to enter the zone if the user fails a computerized validation of the user documentation.

20. The method of claim 18, further comprising capturing a photograph and a biometric of the potential visitor and assigning a unique, secure ID to one of the picture and the biometric.

21. The method of claim 18, further comprising assigning a status to the potential visitor as "acceptable" or "denied."

22. The method of claim 18, further comprising checking the picture and biometric of the potential visitor against a database of information including previous prequalification attempts.

* * * * *

UNITED STATES PATENT AND TRADEMARK OFFICE
CERTIFICATE OF CORRECTION

PATENT NO. : 7,173,532 B2 Page 1 of 1
APPLICATION NO. : 10/810724
DATED : February 7, 2007
INVENTOR(S) : John Paul Hanle et al.

It is certified that error appears in the above--identified patent and that said Letters Patent is hereby corrected as shown below:

Col. 6, line 41, "State" should be -- States --

Col. 8, line 24, "namer?" should be -- name? --

Col. 8, line 44, "air ports" should be -- airports --

Col. 10, line 8, "State" should be -- States --

Col. 11, line 21, "State" should be -- States --

Col. 13, line 42, "An" should be -- A --

Col. 15, line 1, "including further" should be -- including the further --

Signed and Sealed this

Nineteenth Day of June, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,173,532 B2 |
| APPLICATION NO. | : 10/810724 |
| DATED | : February 6, 2007 |
| INVENTOR(S) | : John Paul Hanle et al. |

It is certified that error appears in the above--identified patent and that said Letters Patent is hereby corrected as shown below:

Col. 6, line 41, "State" should be -- States --

Col. 8, line 24, "namer?" should be -- name? --

Col. 8, line 44, "air ports" should be -- airports --

Col. 10, line 8, "State" should be -- States --

Col. 11, line 21, "State" should be -- States --

Col. 13, line 42, "An" should be -- A --

Col. 15, line 1, "including further" should be -- including the further --

This certificate supersedes Certificate of Correction issued June 19, 2007.

Signed and Sealed this

Tenth Day of July, 2007

JON W. DUDAS
*Director of the United States Patent and Trademark Office*